(12) United States Patent
Finizio et al.

(10) Patent No.: US 7,202,459 B2
(45) Date of Patent: Apr. 10, 2007

(54) ACTIVE ELECTRO-OPTICAL DEVICE FOR DETECTING OBSTACLES, IN PARTICULAR FOR AUTONOMOUS NAVIGATION

(75) Inventors: Roberto Finizio, Orbassano (IT); Piermario Repetto, Orbassano (IT); Piero Perlo, Orbassano (IT); Stefano Bernard, Orbassano (IT); Cosimo Carvignese, Orbassano (IT); Nereo Pallaro, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 39 days.

(21) Appl. No.: 10/522,802

(22) PCT Filed: Feb. 25, 2004

(86) PCT No.: PCT/IB2004/000601

§ 371 (c)(1),
(2), (4) Date: Jan. 28, 2005

(87) PCT Pub. No.: WO2004/081598

PCT Pub. Date: Sep. 23, 2004

(65) Prior Publication Data

US 2006/0091286 A1 May 4, 2006

(30) Foreign Application Priority Data

Mar. 14, 2003 (IT) .................. TO2003A000197

(51) Int. Cl.
*G01C 21/02* (2006.01)
*G05D 1/00* (2006.01)

(52) U.S. Cl. .................. 250/206.1; 340/426.1; 701/1

(58) Field of Classification Search ............. 250/206.1, 250/221, 222.1; 340/426.1; 382/278, 291; 701/1
See application file for complete search history.

(56) References Cited

U.S. PATENT DOCUMENTS 5,257,209 A * 10/1993 Markandey .................. 701/1

(Continued)

FOREIGN PATENT DOCUMENTS

EP       4 36 213 A2    12/1990

(Continued)

OTHER PUBLICATIONS

S-B Park et al.: "A Motion Detection System based on a CMOS Photo Sensor Array" Image Processing, 1998, ICIP 98. Proceedings. 1998 International Conference on Chicago, IL, USA Oct. 4-7, 1998. Los Alamitos. CA, USA. IEEE COMPUT., Soc., US, Oct. 4, 1998, pp. 967-971, XP010586845, ISBN 0-8186-8821-1.

(Continued)

*Primary Examiner*—Stephone B. Allen
(74) *Attorney, Agent, or Firm*—Sughrue Mion, PLLC (57) ABSTRACT

An electro-optical system capable of being embarked aboard mobile ground or flying units, to determine the optical flow generated by obstacles in relative motion with respect to the mobile unit. The system comprises radiation emitter means (5), receiver means (1) for converting the radiation reflected by the objects into electrical signals and means (8) for processing the signals generated by the receiver means. The receiver means (1) are based on vision sensors with matrix configuration. The emitter means (5, 6) shape the radiation beam in such a way that the radiation reflected by the objects and collected by the receiver means impacts at least on a part of the receiver matrix. The processing means compute the optical flow only on the elements of the receiver matrix that are impacted by the radiation.

26 Claims, 5 Drawing Sheets

U.S. PATENT DOCUMENTS

| | | | |
|---|---|---|---|
| 5,467,122 A | * | 11/1995 | Bowker et al. ............... 348/31 |
| 5,717,792 A | * | 2/1998 | Poggio et al. .............. 382/278 |
| 5,798,796 A | * | 8/1998 | Sugiyama .............. 375/240.04 |
| 2002/0050924 A1 | * | 5/2002 | Mahbub .................... 340/426 |

FOREIGN PATENT DOCUMENTS

| EP | 6 31 109 A1 | 5/1994 |
|---|---|---|
| EP | 1 256 816 A | 11/2002 |
| WO | WO 01/96147 A | 12/2001 |

OTHER PUBLICATIONS

Yu Chi-Ho et al.: "Determination of Horizontal Motion Through Optical Flow Computations" Oceans '93. Engineering in Harmony with Ocean. Proceedings Victoria, BC, Canada, Oct. 18-21, 1993, New York, NY, USA, IEEE, Oct. 18, 1993, pp. II475-II480, XP010117554, ISBN: 0-7803-1385-2.

* cited by examiner

ACTIVE ELECTRO-OPTICAL DEVICE FOR DETECTING OBSTACLES, IN PARTICULAR FOR AUTONOMOUS NAVIGATION

This is a National Stage entry of International Application PCT/IB04/00601 with an international filing date of Feb. 25, 2004, which was published under PCT Article 21 (2) as WO 2004/081598 A2, and the complete disclosure of which is incorporated into this application by reference.

BACKGROUND OF THE INVENTION

The present invention relates to an active electro-optical device for detecting obstacles, in particular for use in autonomous navigation systems for ground moving or flying units with multiple degrees of freedom.

In particular, the invention relates to a device for detecting obstacles based on the measurement of the optical flow.

The effectiveness of an autonomous navigation system depends on its ability to reach a determined position and/or orientation in space. One of the main problems for a device of this kind consists of perceiving the surrounding environment and reacting in timely fashion.

Electro-optical devices for detecting obstacles based on the measurement of the optical flow have already been proposed. The optical flow indicates the speed whereby elements with different contrast move in a scene, as a result of the relative motion between an observer and the objects present in the scene. If one considers an object moving with a relative speed v with respect to an observer and at an orthogonal distance d with respect to the observer, the optical flow is given by the ratio between the speed v and the distance d.

Therefore, the optical flow measurement depends on the following factors:

resolution, field of view, frame-rate and sensitivity of the receiving means, distance between the receiver means and the objects present in the scene, relative speed between the receiver means and the objects present in the scene.

Electro-optical devices for detecting obstacles based on the measurement of the optical flow are described for example in the following patent documents: U.S. Pat. No. 5,717,792, U.S. Pat. No. 5,257,209, EP 631109, U.S. Pat. No. 5,798,796 and EP 436213.

Algorithms for measuring the optical flow are typically implemented in passive electro-optical devices, i.e. devices which detect the radiation emitted by sources not included in the system (for instance, sun, moon, artificial lighting system, etc.) and reflected by the scene. To simplify computations, typically a small number of distinct sensors are used, whereon the optical flow is computed. The use of receiver means constituted by a great number of sensitive elements (for instance CCD or CMOS vision sensors) would require powerful computational units to implement the artificial vision algorithms. It must be kept in mind that the scene viewed by a passive vision sensor is usually very complex, since it includes objects positioned at a distance which may vary from a few centimetres to infinity. The scene therefore generates an enormous quantity of information about the optical flow of the objects present. The video information of the scene acquired by the optical sensor must then be filtered in the space and frequency domain to reduce the quantity and complexity of the data. Only after the information has been conveniently processed can it be used for optical flow computation.

SUMMARY OF THE INVENTION

The object of the present invention is to provide an active electro-optical device for detecting obstacles which allows to reduce considerably the quantity of data on which optical flow algorithms for obstacle detection are to be implemented.

According to the present invention, said object is achieved by a device having the characteristics set out in the main claim.

BRIEF DESCRIPTION OF THE DRAWINGS

The present invention shall now be described in detail with reference to the accompanying drawings, provided purely by way of non limiting example, in which.

DETAILED DESCRIPTION OF THE INVENTION

Figure 1:
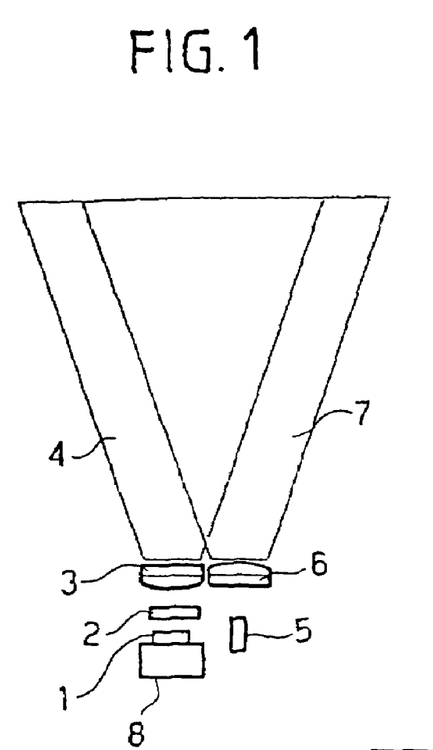
FIG. 1 is a schematic view showing the operating principle of the device according to the present invention.
Figure 2:
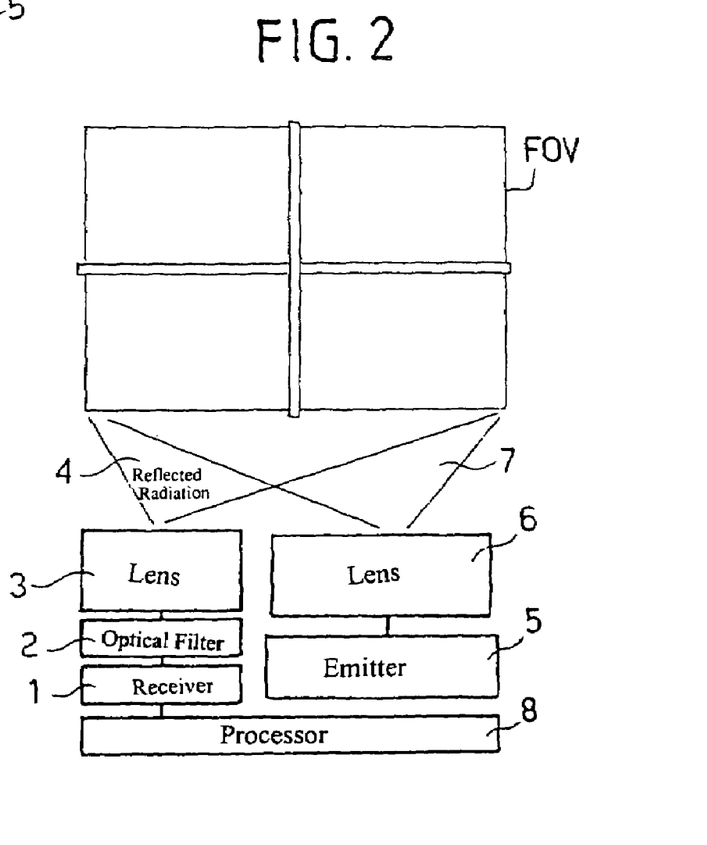
FIG. 2 is a block diagram of the device of FIG. 1, FIGS. 3a and 3b schematically show a scene and the manner whereby the scene is detected by the device according to the present invention.

FIGS. 1 and 2 show the operating principle of the device according to the present invention. Said device comprises radiation emitter means 5, radiation receiver means 1 which collect the radiation reflected by objects situated in the field of view (FOV) and means 8 for processing the electrical signals generated by the receiver means 1. The radiation receiver means 1 can be, for example, CMOS or CCD optical sensors with pixel matrix configuration. The radiation emitter means 5 can, for example, be a semiconductor laser or a LED with narrow-band emission, centred around a wavelength in the visible, infrared or ultraviolet range. The radiation generated by the emitter means 5 is designated by the reference number 7 and the radiation reflected by the objects present in the field of view is designated by the number 4. According to a characteristic of the present invention, the radiation beam 7 generated by the emitter means 5 is shaped in such a way that the reflected radiation 4 collected by the receiver means 1 impacts only on a predefined part of the receiver matrix.

For example, the device according to the present invention can use a cylindrical lens 6 which generates an optical beam 7 of rectangular shape, so conformed that the radiation reflected by the objects and focused on the photosensor matrix by means of an image forming lens 3 impacts a single row (and/or column) of adjacent pixels or a set of adjacent row (and/or columns). A diffraction grating (not shown) can be used in combination with the cylindrical lens 6 to generate a set of rectangular beams, mutually parallel and angularly separated, or to form the beam in complex geometric figures.

To make the electro-optical device immune to the broad band radiation emitted or reflected by the background, the device can be provided with a band-pass optical filter 2 with narrow band, with the transmittance peak centred at the emission peak of the emitter means 5.

The maximum distance of the objects that contribute to the optical flow detected by the receiver means 1 is determined by the intensity of the radiation emitted by the emitter means 5 (and hence by the emission power of the generated optical beam), by the reflectance of the objects impacted by the radiation and by the sensitivity of the receiver means 1.

Optical flow algorithms are implemented on the processing means 8 to determine at what speed the obstacles evolve in the scene with respect to the mobile unit.

The two-dimensional optical flow (F.O.) in a point (x,y) of the focal plane of the image acquired by the receiver means is the vector sum of an optical flow in the direction x and in the direction y, i.e.

$$F.O.=(F.O.)_x \hat{x}+(F.O.)_y \hat{y}$$

where $\hat{x}$ and $\hat{y}$ are the versors respectively in the directions x and y.

The optical flow can be measured using various mathematical approaches (gradient methods, correlation based methods, space-time methods, etc.). In particular, the gradient method is based on estimation of the spatial derivatives $I_x(x,y)$, $I_y(x,y)$ and time derivatives $I_t(x,y)$ associated to each point of the acquired image and on the computation of the optical flow components on the basis of the luminosity conservation equation:

$$I_x(O.F.)_x+I_y(O.F.)_y+I_t=0$$

In the case of a one-dimensional optical flow, for instance if $(O.F.)_y=0$, the equation has only the unknown $(O.F.)_x$ computed as:

$$(O.F.)_x = -\frac{I_t}{I_x}$$

In the case of a two-dimensional optical flow, the equation with two unknowns is solved with iterative techniques which allow to compute the two components $(O.F.)_y$ and $(O.F.)_x$.

Figure 3A:
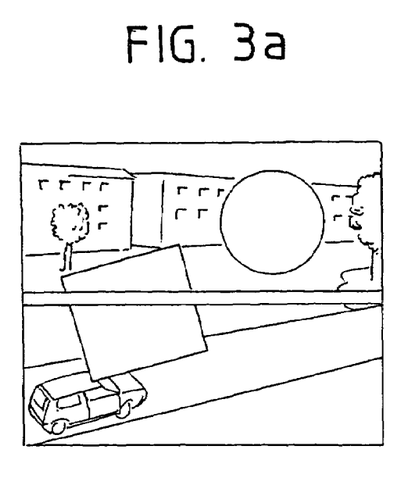
Figure 3B:
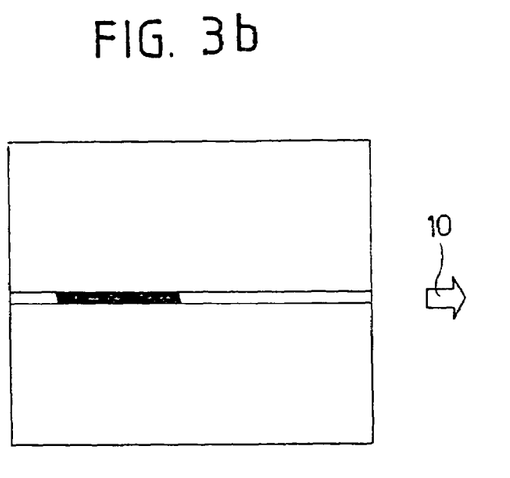

FIGS. 3a and 3b show an example of operation of the electro-optical device according to the present invention. FIG. 3a schematically shows a scene with background at infinite distance in which two nearby objects are present, one with rectangular shape and the other one with circular shape. The device according to the present invention is made in such a way as to illuminate a single row of pixels in the field of view of the receiver means. The strip in FIG. 3a corresponds to the field of view illuminated by the emitter means.

FIG. 3b shows the information acquired by the receiver means. At the field of view illuminated by the emitter means, the receiver means detect, over time, the presence of nearby obstacles.

The processing means 8 compute the optical flow only on the basis of the signals provided by the elements of the matrix of receivers (pixels) impacted by the radiation. In the example shown in FIG. 3, the radiation reflected by the objects and focused on the sensor matrix can impact a single row of sensors (pixels) or a sheaf of rows adjacent to each other.

The device according to the present invention allows to define the maximum distance of the objects which contribute to the computation of the optical flow. Said distance is determined by the intensity of the radiation emitted by the emitter means, by the reflectance of the objects impacted by the radiation and by the sensitivity of the receiver means. The device according to the present invention can therefore be calibrated in such a way as to limit to a predetermined value the maximum distance of the objects which contribute to the measured optical flow. In this way, the information about the other objects of the scene (including the background) is filtered optically. This allows to reduce enormously the quantity of data on which the algorithms for determining the optical flow for obstacle detection are to be implemented. In other words, the system acquires a simplified information of the scene in which only the obstacles positioned in determined portions of the field of view (defined by the shape of the emitted beam) and within a distance range defined by the power of the emitted beam, by the reflectance of the objects and by the sensitivity of the receiver means are highlighted.

Figure 4A:
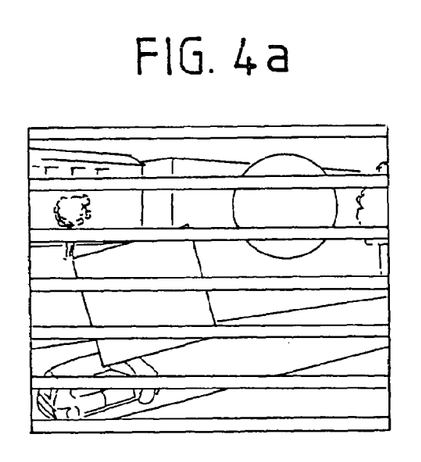
FIGS. 4a, 4b, 5a, 5b, 6a, 6b, 7a and 7b are schematic views of a scene and the manner whereby said scene is detected by some embodiments of the device according to the present invention.
Figure 4B:
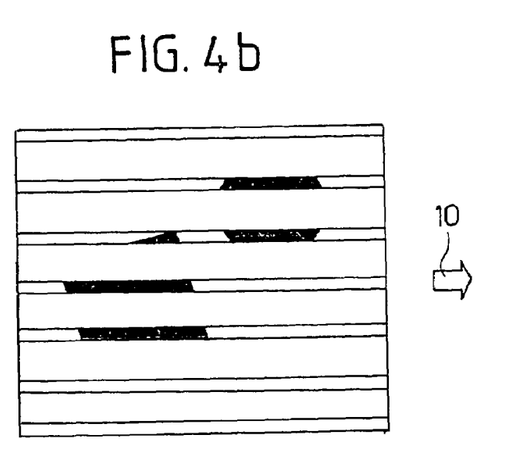

In the example shown in FIGS. 4a and 4b, the radiation beam generated by the emitter is shaped in such a way that the radiation reflected by the objects and focused on the sensor matrix impacts a plurality of rows separated from each other. Each row can impact a single array of sensors (pixels) of the matrix or a sheaf of mutually adjacent sensor arrays.

In the examples shown in FIGS. 3b and 4b, the radiation reflected by the objects and focused on the sensor matrix impacts a single line (FIG. 3b) or a set of mutually parallel lines (FIG. 4b), parallel to the direction of motion indicated by the arrow 10 in FIGS. 3b and 4b.

Figure 5A:
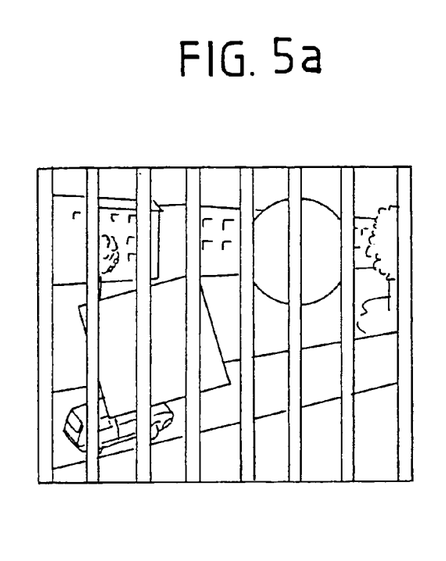
Figure 5B:
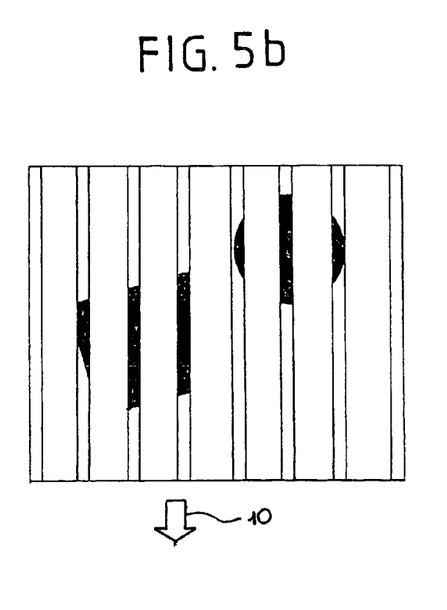

The radiation beam generated by the emitter can be shaped in such a way that the radiation reflected by the objects and focused on the sensor matrix impacts a single column of the sensor matrix or a sheaf of mutually adjacent columns. In the example shown in FIGS. 5a and 5b, the radiation beam generated by the emitter is shaped in such a way that the radiation reflected by the objects and focused on the sensor matrix impacts a plurality of mutually separated columns. Each column can impact a single array of sensors or a sheaf of mutually adjacent sensor arrays. In the example shown in FIG. 5b, too, the radiation focused on the sensor matrix impacts one or more lines, parallel to the main direction of motion indicated by the arrow 10.

Figure 6A:
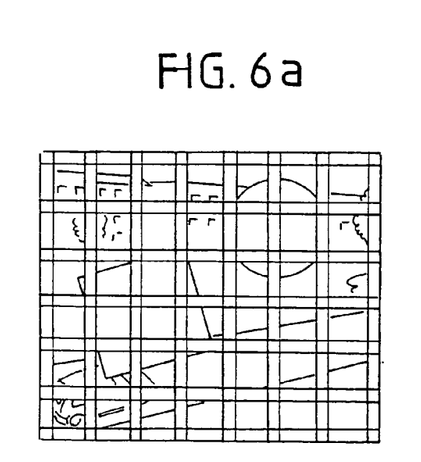
Figure 6B:
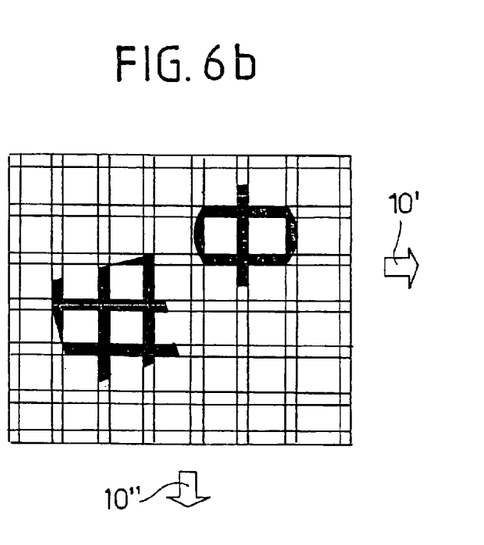

In the example shown in FIGS. 6a and 6b, the radiation focused on the sensor matrix impacts a plurality of rows and a plurality of columns according to a general grid configuration. Each row and each column can illuminate a single pixel array or a sheaf of mutually adjacent pixel arrays of the sensor matrix. In FIG. 6b, the rows are parallel to a first component of the direction of motion 10' and the columns are parallel to a second component of the direction of motion 10".

Figure 7A:
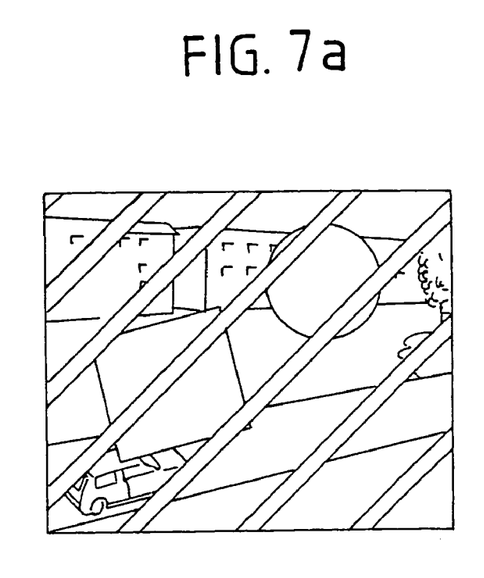
Figure 7B:
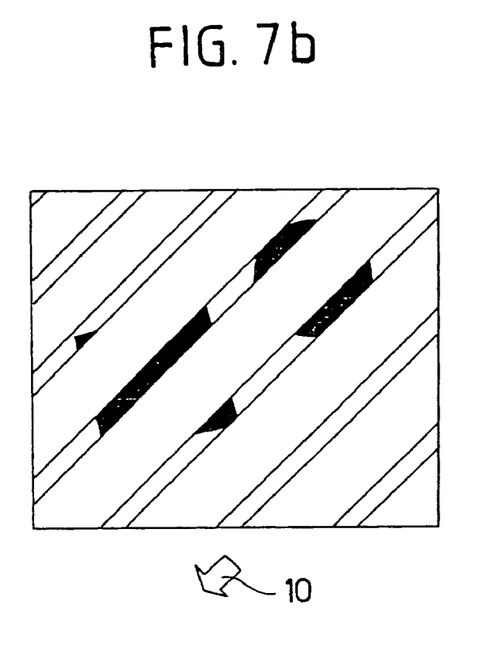

In the additional example shown in FIGS. 7a and 7b, the radiation reflected by the objects and focused on the sensor matrix impacts a single plurality of inclined lines, parallel to the direction of motion 10. As a further variant, the radiation focused on the sensor matrix could impact a set of slanted lines, each parallel to one of the main directions of motion.

The radiation generated by the emitter can also be shaped in such a way that the radiation reflected by the objects and focused on the sensor matrix impacts a set of sheaves of lines, where the lines of each sheaf are mutually parallel and parallel to one of the components of the motion, whilst the sheaves are not parallel to each other. The different sheaves can be generated by as many distinct sources of radiation. The radiation sources for the different sheaves can have mutually different peak wavelengths. Moreover, the different sheaves of lines with the different wavelengths can be collected by distinct receivers.

Figure 8:
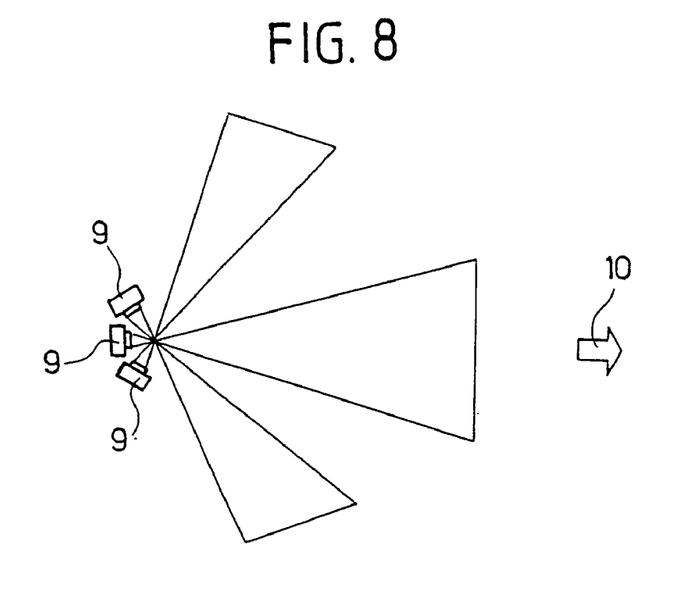
FIG. 8 is a schematic view showing the arrangement of three devices according to the present invention for measuring the frontal and lateral optical flow with respect to the direction of motion.

One ore more active electro-optical devices according to the present invention can be used as a device for detecting obstacles in autonomous navigation systems. FIG. 8 shows an example of a system with three electro-optical devices 9 for measuring the optical flow of the front area of the two lateral views of a mobile unit with the direction of motion indicated by the arrow 10. In the example of FIG. 8, the fields of view of the individual electro-optical devices 9 do not overlap. Alternatively, the devices 9 can be positioned in such a way that the respective fields of view mutually overlap at least partially.

Figure 9:
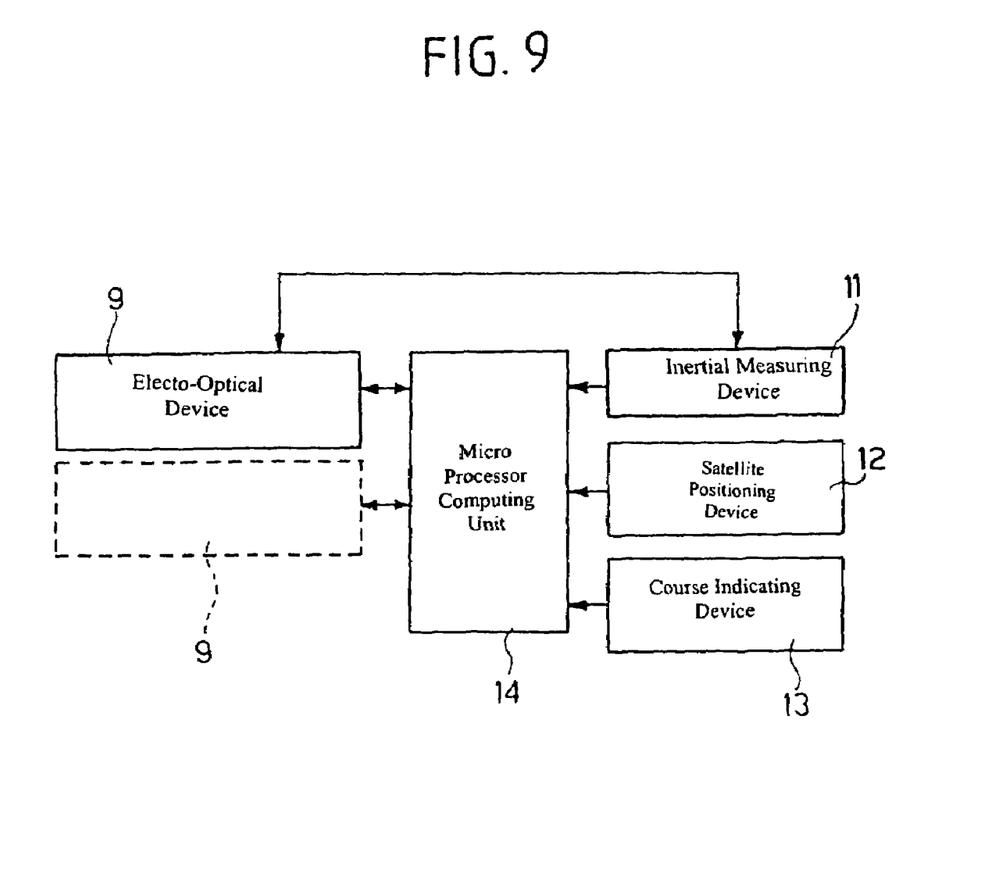
FIG. 9 is a block diagram of an autonomous navigation system using an electro-optical device according to the present invention.

One or more electro-optical devices according to the invention can be integrated with inertial measuring and locating devices to obtain integrated systems for the autonomous stabilisation and navigation of ground moving or flying platforms. FIG. 9 schematically shows an autonomous navigation system comprising a microprocessor computing unit 14, inertial measuring devices 11, course indicating devices 13, satellite positioning devices 12 and one or more electro-optical devices 9 of the type described above. The inertial measuring system 11 can be of the "strap-down" type with six degrees of freedom and constituted by three gyroscopes and three accelerometers with the axes oriented in three orthogonal directions. The course indicating unit 13 can employ a three-axis magnetometer which measures the Earth's magnetic field. The satellite positioning unit 12 can be constituted by a GPS (or Galileo) receiver and antenna.

Naturally, without altering the principle of the invention, the construction details and the embodiments may be widely varied relative to what is described and illustrated purely by way of example herein, without thereby departing from the scope of the present invention as defined in the claims that follow.

What is claimed is:

1. An electro-optical system capable of being embarked aboard a mobile unit, for determining optical flow generated by obstacles in relative motion with respect to the mobile unit characterized in that it comprises radiation emitter means (5), receiver means (1) for converting the radiation reflected by objects into electrical signals and means (8) for processing the signals generated by said receiver means (1), in which said receiver means (1) comprise at least a vision sensor with receiver matrix configuration and in which said emitter means (5,6) conform the radiation beam in such a way that the radiation reflected by objects and collected by the receiver means impacts at least a part of the receiver matrix configuration, and in which said processing means compute the optical flow only on the elements of the receiver matrix configuration that are impacted by the radiation.

2. A system as claimed in claim 1, characterized in that the optical flow is determined within a predetermined distance range.

3. A system as claimed in claim 2, characterized in that a maximum distance of the objects that contribute to the optical flow is determined by the intensity of the radiation emitted by the emitter means (5), by the reflectance of the objects impacted by the radiation and by the sensitivity of the receiver means (1).

4. A system as claimed in claim 1, characterized in that the distribution and the shape of the receivers within the matrix are linked to the shape of the beam of radiation emitted by the emitter means (5).

5. A system as claimed in claim 1, characterized in that it comprises a band-pass optical filter with narrow band (2), with the transmittance peak centered at the emission peak of the emitter means (5).

6. A system as claimed in claim 1, characterized in that said receiver means (1) comprise a matrix of CCD or CMOS sensors.

7. A system as claimed in claim 1, characterized in that the radiation beam (7) generated by the emitter means (5) is shaped in such a way that the radiation (4) reflected by the objects and focused on the receiver means (1) impacts a single array of sensors or a sheaf of adjacent sensor arrays.

8. A system as claimed in claim 1, characterized in that the radiation beam (7) generated by the emitter means (5 6)) is shaped in such a way that the radiation (4) reflected by the objects and focused on the receiver means (1) impacts a set of mutually separate rows.

9. A system as claimed in claim 1, characterized in that the radiation beam (7) generated by said emitter means (5, 6)) is shaped in such a way that the radiation (4) reflected by the objects and focused on the receiver means (1) impacts a set of sheaves of rows, where the rows of each sheaf are mutually adjacent and the sheaves are separate from each other.

10. A system as claimed in claim 1, characterized in that the radiation beam (7) generated by said emitter means (5, 6) is shaped in such a way that the radiation (4) reflected by the objects and focused on the receiver means (1) impacts a single column or a sheaf of adjacent columns.

11. A system as claimed in claim 1, characterized in that the radiation beam (7) generated by said emitter means (5, 6) is shaped in such a way that the radiation (4) reflected by the objects and focused on the receiver means (1) impacts a plurality of mutually separate columns.

12. A system as claimed in claim 1, characterized in that the radiation beam (7) generated by said emitter means (5, 6)) is shaped in such a way that the radiation (4) reflected by the objects and focused on the receiver means (1) impacts a set of sheaves of columns, where the columns of each sheaf are mutually adjacent and the sheaves are separate from each other.

13. A system as claimed in claim 1, characterized in that the radiation beam (7) generated by said emitter means (5, 6) is shaped in such a way that the radiation (4) reflected by the objects and focused on the receiver means (1) impacts a single line or a set of mutually parallel lines, parallel to the main direction of motion (10).

14. A system as claimed in claim 1, characterized in that the radiation beam (7) generated by said emitter means (5, 6)) is shaped in such a way that the radiation (4) reflected by the objects and focused on the receiver means (1) impacts a set of canted lines each parallel to one of the main directions of motion.

15. A system as claimed in claim 1, characterized in that the radiation beam (7) generated by said emitter means (5 6) is shaped in such a way that the radiation (4) reflected by the objects and focused on the receiver means (1) impacts a set of sheaves of lines, where the lines of each sheaf are parallel to each other and parallel to one of the components of the motion, whilst the beams are not parallel to each other.

16. A system as claimed in claim 15, characterized in that the different sheaves of lines are generated by as many distinct radiation sources.

17. A system as claimed in claim 16, characterized in that the radiation sources for the different sheaves have a different peak wavelength.

18. A system as claimed in claim 17, characterized in that the different sheaves of lines with the different wavelengths collected distinct are receivers.

19. An electro-optical according to claim 1, wherein algorithms for determining the optical flow are implemented on a processor using VLSI (Very Large Scale Integration) technology.

20. An electro-optical system as claimed in claim 1, characterized in that it comprises an optical device for measuring the distances of obstacles.

21. An autonomous navigation device comprising a plurality of systems capable of being embarked aboard a mobile unit, for determining optical flow generated by obstacles in relative motion with respect to the mobile unit characterized in that it comprises radiation emitter means (5), receiver means (1) for converting the radiation reflected by objects into electrical signals and means (8) for processing the signals generated by said receiver means (1), in which said receiver means (1) comprise at least a vision sensor with receiver matrix configuration and in which said emitter means (5, 6) conform the radiation beam in such a way that the radiation reflected by objects and collected by the receiver means impacts at least a part of the receiver matrix configuration, and in which said processing means compute the optical flow only on the elements of the receiver matrix configuration that are impacted by the radiation, each system oriented in a different spatial direction, angularly separated from the others, so that the fields of view of the individual electro-optical systems do not overlap.

22. device for detecting obstacles comprising plurality systems capable of being embarked aboard a mobile unit, for determining optical flow generated by obstacles in relative motion with respect to the mobile unit characterized in that it comprises radiation emitter means (5), receiver means (1) for converting the radiation reflected by objects into electrical signals and means (8) for processing the signals generated by said receiver means (1), in which said receiver means (1) comprise at least a vision sensor with receiver matrix configuration and in which said emitter means (5, 6) conform the radiation beam in such a way that the radiation reflected by objects and collected by the receiver means impacts at least a part of the receiver matrix configuration, and in which said processing means compute the optical flow only on the elements of the receiver matrix configuration that are impacted by the radiation, each system oriented different spatial direction, angularly separated from the others so that the fields of view of the individual electrooptical systems mutually overlap at least partially.

23. An anti-collision system or an autonomous navigation system for mobile units, characterized in that it comprises and electro-optical system capable of being embarked aboard a mobile unit, for determining optical flow generated by obstacles in relative motion with respect to the mobile unit characterized in that it comprises radiation emitter means (5), receiver means (1) for converting the radiation reflected by objects into electrical signals and means (8) for processing the signals generated by said receiver means (1), in which said receiver means (1) comprise at least a vision sensor with receiver matrix configuration and in which said emitter means (5, 6) conform the radiation beam in such a way that the radiation reflected by objects and collected by the receiver means impacts at least a part of the receiver matrix configuration, and in which said processing means compute the optical flow only on the elements of the receiver matrix configuration that are impacted by the radiation.

24. A system as claimed in claim 23, characterized in that it comprises a "strap-down" inertial navigation device.

25. A system as claimed in claim 24, characterized in that the inertial navigation device comprises three gyroscopes, three accelerometers and/or a magnetometer with three axes used as course indicator and/or a satellite positioning system.

26. An electro-optical system capable of being embarked aboard a mobile unit, for determining optical flow generated by obstacles in relative motion with respect to the mobile unit characterized in that it comprises radiation emitter means (5), receiver means (1) for converting the radiation reflected by objects into electrical signals and means (8) for processing the signals generated by said receiver means (1), in which said receiver means (1) comprise at least a vision sensor with receiver matrix configuration and in which said emitter means (5, 6) conform the radiation beam in such a way that the radiation reflected by objects and collected by the receiver means impacts only a part of the receiver matrix configuration, and in which said processing means compute the optical flow only on the elements of the receiver matrix configuration that are impacted by the radiation.

* * * * *